United States Patent [19]

Shimanaka et al.

[11] 3,985,583
[45] Oct. 12, 1976

[54] METHOD FOR FORMING AN INSULATING COATING ON AN ORIENTED SILICON STEEL SHEET

[75] Inventors: Hiroshi Shimanaka, Funabashi; Toshio Ichida; Shigeru Kobayashi, both of Chiba, all of Japan

[73] Assignee: Kawasaki Steel Corporation, Kobe, Japan

[22] Filed: Sept. 19, 1974

[21] Appl. No.: 507,283

[30] Foreign Application Priority Data

Nov. 17, 1973 Japan................................ 48-129495

[52] U.S. Cl............................... 148/6.16; 148/6.35; 148/16.7; 148/113; 148/6.15 R
[51] Int. Cl.²........................ C23F 7/10; C23F 7/26
[58] Field of Search.............. 148/6.15 R, 6.16, 6.35, 148/16.7, 113

[56] References Cited
UNITED STATES PATENTS

| | | |
|---|---|---|
| 2,484,242 | 10/1949 | Nagel et al.................... 148/6.15 R |
| 3,138,492 | 6/1964 | Peny et al...................... 148/6.15 R |
| 3,248,249 | 4/1966 | Collins.............................. 148/6.16 |
| 3,562,011 | 2/1971 | Hust et al....................... 148/6.16 X |
| 3,615,918 | 10/1971 | Evans et al........................ 148/113 |
| 3,856,568 | 12/1974 | Tanaka et al.................. 148/6.16 X |

*Primary Examiner*—Ralph S. Kendall
*Assistant Examiner*—Charles R. Wolfe, Jr.

[57] ABSTRACT

An insulating coating having a high adhesion on an oriented silicon steel sheet, which applies a tension on the surface of the steel sheet and restrains magnetostriction increased when compressive stress is subjected to said oriented silicon steel sheet, is formed by applying a coating aqueous dispersion of 7 – 24% by weight of colloidal silica and 5 – 30% by weight of magnesium phosphate in monobasic magnesium phosphate on the oriented silicon steel sheet and baking the thus treated steel sheet at a temperature of 350° – 900°C. Said coating is more improved by adding 0.01 – 5% by weight of at least one of chromic anhydride, chromates and bichromates to said coating aqueous dispersion.

4 Claims, 3 Drawing Figures

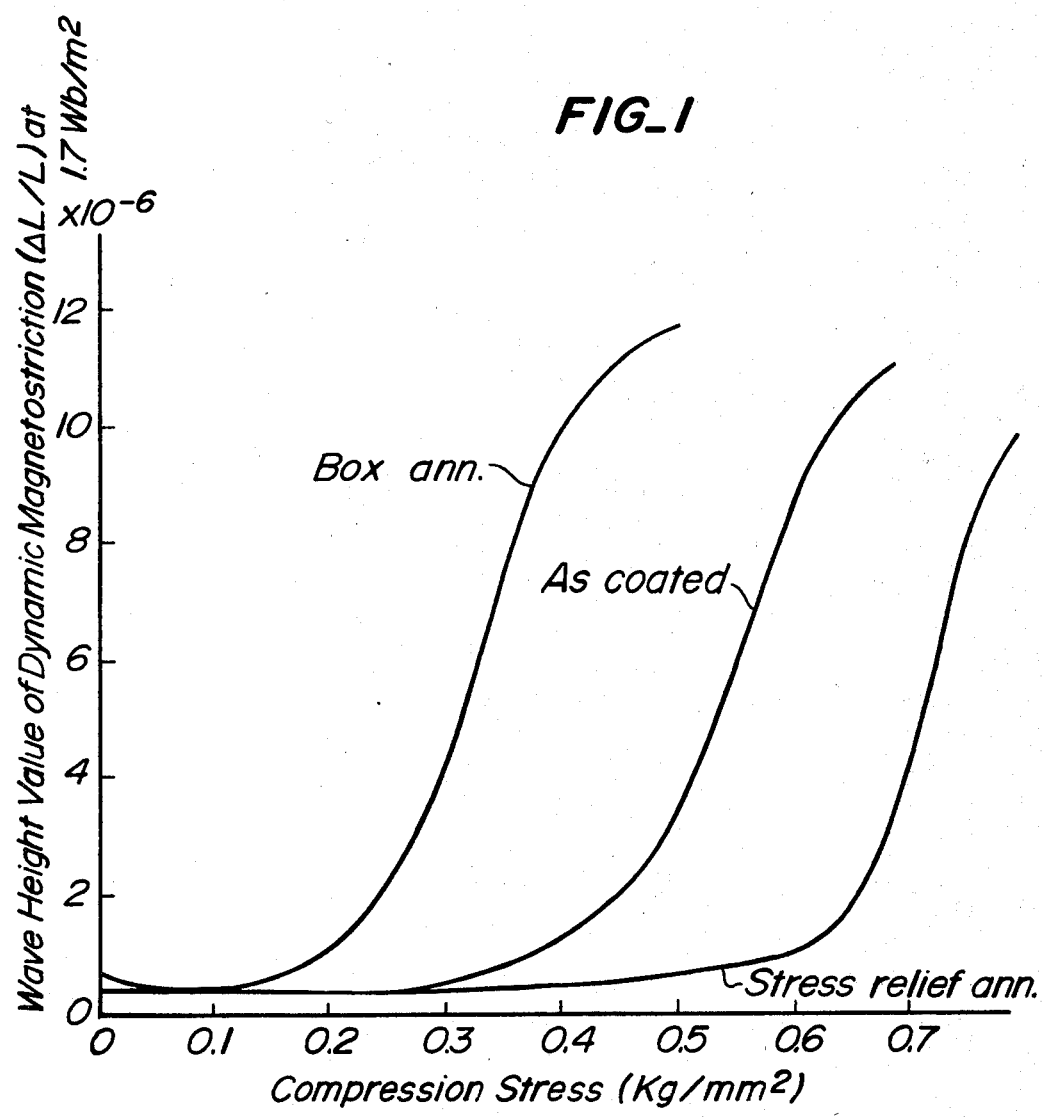

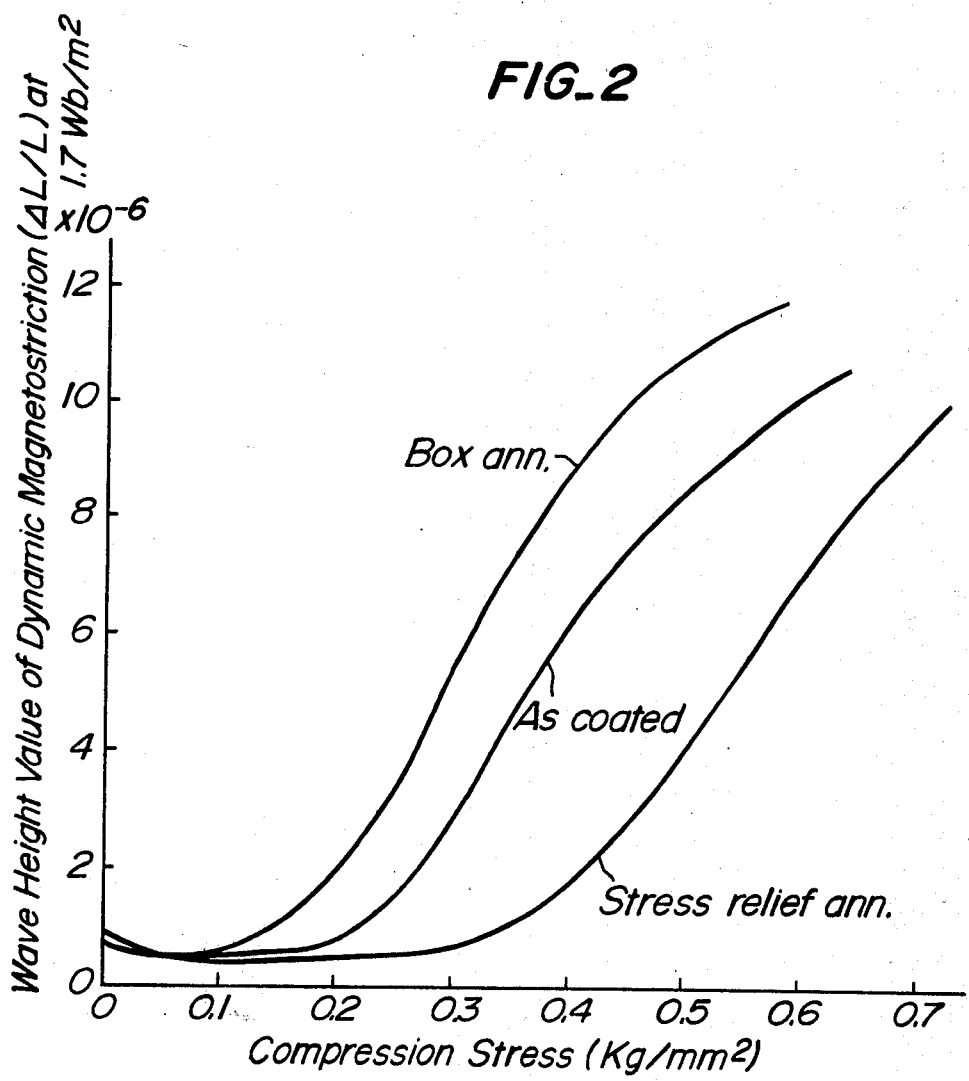

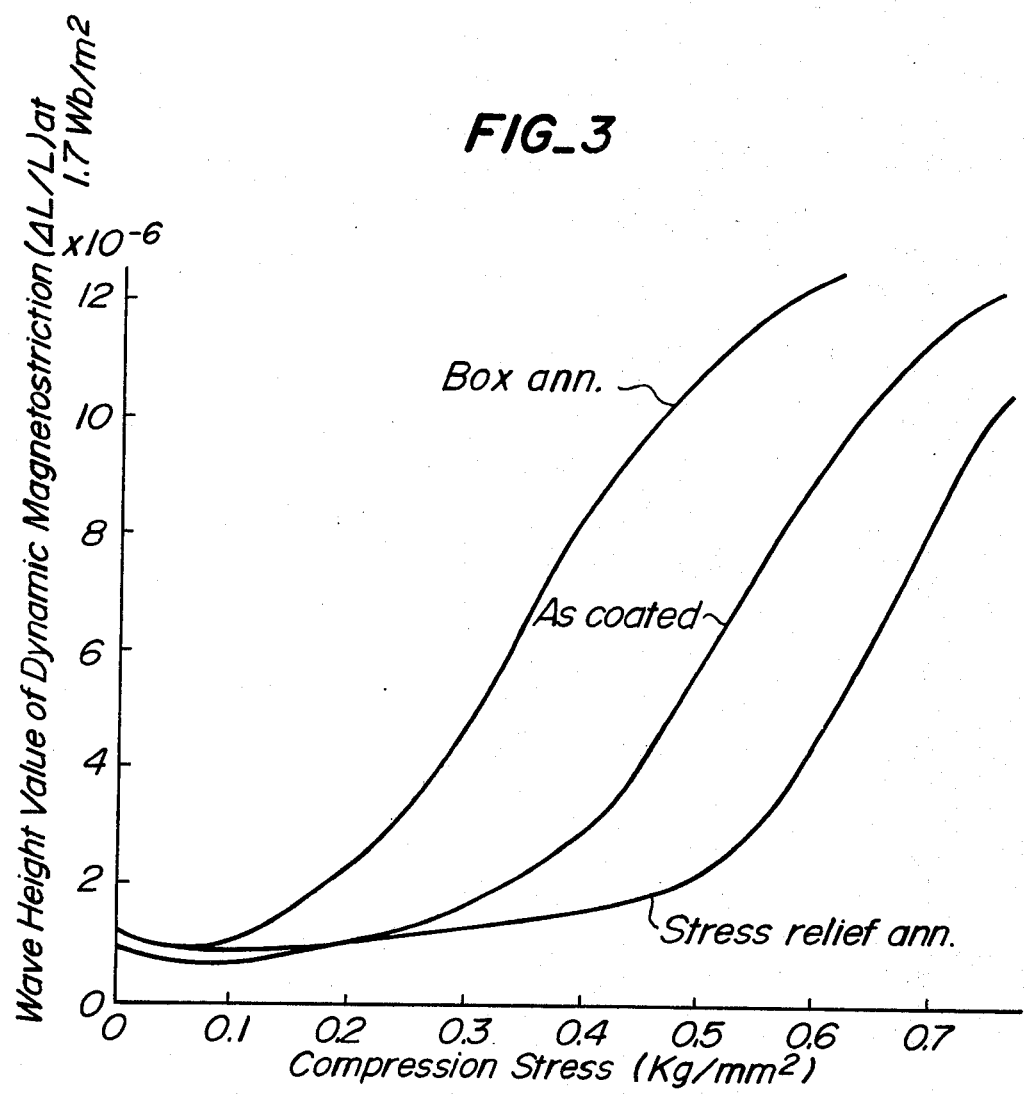

METHOD FOR FORMING AN INSULATING COATING ON AN ORIENTED SILICON STEEL SHEET

The present invention relates to the formation of an insulating coating which applies a tension on a surface of an oriented silicon steel sheet and restrains magnetostriction increased when compressive stress is subjected to said oriented silicon steel sheet.

The magnetostriction of the oriented silicon steel sheets is a phenomenon in which the steel sheet expands, contracts and vibrates when the steel sheet is magnetized and is the greatest cause of the transformer noise.

The cause of the magnestostriction is based on the fact that the magnetization process of the steel sheet includes 90° wall motion. The rotational magnetization and the magnetostriction is increased by the compressive stress applied to the steel sheet. The compressive stress is inevitably applied to the steel sheet upon the assembling of the transformer but if tension is previously applied to the steel sheet, the magnetostriction increase when the compressive stress is applied to the steel sheet can be restrained. The tensile stress given to the steel sheet affects not only the magnetostriction but also the improvement of the iron loss of the oriented silicon steel. The effect is particularly noticeable in a material having an excellent orientation (for example, RG-H made by Kawasaki Steel Corporation).

The surface of the oriented silicon steel sheet consists usually of the crystalline forsterite ceramic film formed by the reaction of the previously formed silica with magnesia of the annealing separator in the final annealing and the phosphate insulating coating applied thereafter. The tension to the steel sheet is given by these double coatings but the present invention has considerably improved the effect on tension by the insulating coating. The tension given to the steel sheet by the insulating coating is provided in the cooling process after the coating has been formed, so that a coating composition having a small shrinkage coefficient in the range between coating temperature and room temperature is preferable. Namely, the composition having a low thermal expansion coefficient is preferred.

Some processes for applying tension to the steel sheet for restraining the magnetostriction increased when the compressive stress is applied on the steel sheet, have been proposed while one process utilizes a glass and the other process involves compounding colloidal silica with the conventional phosphate. The former process, as shown in Japanese patent application publication No. 8242-56, utilizes a glass having a low thermal expansion coefficient as the insulating coating. The latter process, as shown in Japanese patent laid open application No. 39388-73, utilizes as the coating aqueous dispersion of colloidal silica, aluminum phosphate and at least one of chromic anhydride and chromates.

Any of these processes can restrain the increase of the magnetostriction to a certain degree and therefore when the compositions are applied on an oriented silicon steel having a high magnetic induction, the iron loss is lowered. However, in both the cases, the adhesion is poor and in the bent portion in a small curvature radius, when using as a cut core, and in the edge portion after shearing, when using as a laminated core, the insulating coating flakes and drops off and an improvement has been required.

The inventors have made a variety of experiments in order to restrain the increase of the magnetostriction of the oriented silicon steel sheet and to develop the insulating coating having a high adhesion. They have succeeded in much more effectively restraining the increase of the magnetostriction as compared with the conventional phosphate-chromic acid coating by using the insulating coating reagent of colloidal silica, magnesium phosphate and at least one of chromic anhydride, chromates and bichromates. Furthermore, it has been found that this insulating coating, while providing the increase in restraint in magnetostriction, also provides better adhesion than the above described insulating coating of colloidal silica aluminum phosphate and at least one of chromic anhydride and chromates.

In order to provide tension to the steel sheet, it is preferable to use silicate glass ($SiO_2$) having a very small thermal expansion coefficient as mentioned above. However, the silicate glass does not melt and form a film at a usual baking temperature of 800° – 900° C in the process as in the above described Japanese patent application publication No. 824256. On the other hand, it has been found that a uniform coating can be obtained in the case of colloidal silica. But the colloidal silica alone is poor in the reaction with the magnesium silicate film and the cohesion of silica is also poor. In order to improve these defects, a binder is essential and as this binder, phosphates are preferable but the inventors have found after a variety of experiments that the effect for restraining the increase of the magnetostriction considerably varies depending upon the kind of metal ions the phosphates and the compounding ratio of the phosphate to the colloidal silica. Namely, as the metal ion, magnesium is substantially preferred and the compounding ratio of colloidal silica and magnesium phosphate is preferred to be 10/90 – 40/60, more particularly 20/80 – 30/70 in the molar ratio as $Mg(PO_3)_2/SiO_2$. If magnesium phosphate is less than such an amount, the adhesion of the coating is poor and if magnesium phosphate is larger than such an amount, the coating becomes hygroscropic. As the colloidal silica, a commercially available aqueous dispersion of 20 – 30% by weight can be used. Magnesium phosphate can be used in any concentration, if said salt is an aqueous solution of monobasic magnesium phosphate but a concentration of $Mg(H_2PO_4)_2$ of 25 – 50% by weight is preferable in view of the coating working. The coating reagent is prepared so that monobasic magnesium phosphate ($Mg(H_2PO_4)_2$ is dehydrated upon baking to convert into magnesium metaphosphate) becomes 10 – 40 mol percent in the mixture with colloidal silica (which becomes $SiO_2$ upon baking) as mentioned above. In order to make the appearance good, at least one of chromic anhydride, chromates and bichromates (the metal ions of the salts may be any metal ions as well as alkali metals and alkaline earth metals) is added into the coating reagent in an amount of 0.01 – 5% by weight. The above described coating reagent consists of about 7 – 24% by weight of colloidal silica, 5 – 30% by weight of monobasic magnesium phosphate and 0.01 – 5% by weight of at least one of chromic anhydride, chromates and bichromates and the remainder of water.

According to the method of the present invention, the oriented silicon steel sheet is immersed in the above described coating reagent and an appropriate amount of the composition is applied on the steel sheet by means of a wringer roll and then baked. The baking temperature is a range from 350° to 900° C and the baking atmosphere may be oxidizing, neutral and reducing but the baking in air is advantageous in view of the cost. For example, even when baking in air at 800° C for several minutes, the insulating coating is not deteriorated and this fact will has the advantage that even when a user effects a stress relief annealing of a single sheet in air, no change occurs on the surface. It has been found that the baking in neutral or weak oxidizing atmosphere is better for the adhesion of the coating than that in a reducing atmosphere, for example $N_2$ 90% + $H_2$ 10%. In the baking of the coating formed by this coating reagent, the higher the temperature and the longer the time, the greater the effect for restraining the increase of the magnetostriction and the improvement of the iron loss. Generally it is preferable to bake at 750° to 850° C for 1 to 3 minutes. Especially, when no stress relief annealing is effected in the user side after shearing and assembling, the baking in such a manner is preferable. On the other hand, if the stress relief annealing at about 800° C is effected, a lower baking temperature may be adopted but the baking temperature must be higher than 350° C because the effect for restraining the increase of the magnetostriction is not obtained.

The baking temperature higher than 900° C is not preferable because the adhesion of the coating is deteriorated.

The baking step may be effected in one stage but it is commercially practical to effect the baking step in two stages by conducting the first baking at a temperature of 350° – 600° C and then effecting the second baking at a temperature of 800° –900° C for the flattening annealing to remove the coil set.

When the amount of colloidal silica is less than 7% by weight, the properties necessary for the surface of the electrical steel sheet including the desired adhesion can not be obtained, while when said amount exceeds 24% by weight, an adverse influence is caused in the evenness and uniformity of the coating. In the same manner, when the amount of magnesium phosphate is less than 5% by weight, the properties necessary for the surface of the electrical steel sheet, for example the adhesion are not satisfied, while when said amount exceeds 30% by weight, the evenness and uniformity of the coating are possibly deteriorated.

The present invention will be explained in more detail.

For a better understanding of the invention, reference is taken to the accompanying drawings, wherein:

FIG. 1 is a diagram showing the relation of the peak height value of dynamic magnetostriction to the compressive stress owing to the coating according to the present invention;

FIG. 2 is a diagram showing the relation of the peak height value of dynamic magnetostriction to the compressive stress owing to the conventional phosphatechromic acid coating; and FIG. 3 is a diagram showing the relation of the peak height value of dynamic magnetostriction to the compressive stress owing to the coating disclosed in Japanese patent laid open application No. 39338-73.

The following examples are given for the purpose of illustrating this invention and are not intended as limitations thereof.

EXAMPLE 1

After the final annealing of an oriented silicon steel sheet having a thickness of 0.30 mm, an unreacted separator on the surface was removed and from the thus treated coil, samples were taken out contiguously and these samples were subjected to a stress relief annealing combined with a flattening. These samples were applied with the conventional magnesium phosphate-chromic acid coating liquid, the coating reagent described in Japanese patent laid open application No. 3938-73 and the coating reagent according to the present invention which consists of 100 cc of 20% aqueous dispersion of colloidal silica and 50 cc of 35% aqueous solution of monobasic magnesium phosphate and baked at 800° C for 30 seconds under nitrogen atmosphere. The thickness of the coating after baking was about 2 $\mu$. After the baking, the samples were subjected to a stress relief annealing at 800° C for 3 hours under nitrogen atmosphere. The relation of the magnetostriction to the compressive stress was shown by the peak height value of the dynamic magnetostriction under an alternate current. The following Table 1 shows the results of measurement of the magnetostriction under the compressive stress.

Table 1

| | Condition of sample | $B_8$ Wb/m² | Magnetostriction under compressive stress (×10⁻⁶) (compressive stress Kg/mm² at 1.7 Wb/m²) | | | |
|---|---|---|---|---|---|---|
| | | | 0.0 | 0.3 | 0.5 | 0.7 |
| Test 1 | only a base coating of magnesium silicate (mother) | 1.905 | 1.7 | 4.8 | 10.3 | 11.9 |
| | coating of present invention after stress relief annealing | 1.907 | 1.0 | 0.7 | 2.1 | 6.8 |
| Test 2 | only a base coating of magnesium silicate (mother) | 1.903 | 1.5 | 5.3 | 10.9 | 12.3 |
| | phosphate-chromic acid coating after stress relief annealing | 1.903 | 1.2 | 1.3 | 6.0 | 9.5 |
| Test 3 | only a base coating of magnesium silicate (mother) | 1.903 | 1.6 | 4.9 | 10.7 | 12.0 |
| | coating of Japanese patent laid open application No. 39338-73 after stress relief annealing | 1.904 | 1.0 | 0.7 | 3.4 | 8.3 |

From the above Table 1, it can be seen that the insulating coating of the present invention has a remarkable effect against the compressive stress and the steel sheet is subjected to a strong tension.

The results of the dropping off test of the coating owing to bending are shown in the following Table 2.

The samples were bent by circular rods having various diameters and the dropped off condition of the coating at the inside of the bend portion was observed.

Table 2

| | (after stress relief annealing) | | |
|---|---|---|---|
| Bending diameter (mm) | Coating of present invention | Coating of Japanese patent laid open application No. 39338-73 | Conventional phosphate-chromic acid coating |
| 20 | Not drop off | Slightly drop off | Not drop off |
| 15 | Not drop off | Drop off | Not drop off |
| 10 | Drop off | Drop off | Drop off |

From the above Table, it can be seen that the coating of the present invention overcomes the defect of the above described Japanese patent laid open application No. 39338-73 and the adhesion of the coating of the present invention is as good as that of the conventional phosphate-chromic acid coating.

The results of the measurement of the adhesion of the coatings are shown in the following Table 3.

Table 3

| | (after stress relief annealing) | | |
|---|---|---|---|
| Strength | Coating of present invention | Coating of Japanese patent laid open application No. 39338-73 | Conventional phosphate-chromic acid coating |
| $Kg/cm^2$ | about 70 | about 50 | about 70 |

The results in the above Table 3 show the same tendency as the results in the above Table 2.

EXAMPLE 2

The samples were prepared for in the same manner as described in the above described Example 1. These samples were treated with the conventional phosphate-chromic acid coating, the coating reagent in Japanese patent laid open application No. 39338-73 and the coating reagent of the present invention, which consists of 100 cc of 30% aqueous dispersion of colloidal silica, 80 cc of 40% aqueous solution of magnesium phosphate and 3 g of chromic anhydride and 1.5 g of potassium bichromate and then baked at 800° C for 1 minute in air. After the baking, the samples were subjected to a stress relief annealing at 800° C for 3 hours under nitrogen atmosphere. FIGS. 1 – 3 show the effect of the insulating coatings on the relation of magnetostriction to compressive stress before the coating after the calcining and after the stress relief annealing. From the results in FIGS. 1 – 3, it can be seen that the coating of the present invention shows lower dynamic magnetostriction than those of the conventional phosphate-chromic acid coating and the above described Japanese patent laid open application No. 39338-73.

The following Table 4 shows the results of the magnetic properties and the magnetostriction measured in the same manner as described in Example 1 before coating and after coating and stress relief annealing.

Table 4

| | | Various Properties | | | | | | |
|---|---|---|---|---|---|---|---|---|
| | Condition of sample | $B_8$ $Wb/m^2$ | $W_{15/50}$ $W/Kg$ | $W_{17/50}$ $W/Kg$ | Magnetostriction under compressive stress ($\times 10^{-6}$) (compressive stress $Kg/mm^2$ at $1.7 Wb/m^2$) | | | |
| | | | | | 0.0 | 0.3 | 0.5 | 0.7 |
| Test 1 | only a base coating of magnesium silicate | 1.906 | 0.86 | 1.22 | 0.8 | 2.3 | 7.5 | 9.9 |
| | coating of present invention after stress relief annealing | 1.906 | 0.82 | 1.14 | 0.9 | 0.9 | 1.0 | 3.1 |
| Test 2 | only a base coating of magnesium silicate | 1.905 | 0.85 | 1.20 | 0.9 | 2.1 | 7.4 | 10.1 |
| | phosphate-chromic acid coating after stress relief annealing | 1.905 | 0.83 | 1.17 | 0.8 | 1.0 | 4.2 | 6.8 |
| Test 3 | only a base coating of magnesium silicate | 1.905 | 0.85 | 1.18 | 1.1 | 2.0 | 7.7 | 10.1 |
| Test 3 | coating of Japanese patent laid open application No. 39338-73 after stress relief annealing | 1.905 | 0.81 | 1.13 | 1.1 | 0.9 | 2.1 | 5.6 |

EXAMPLE 3

1.5 g of potassium chromate was used instead of 1.5 g of potassium bichromate in Example 2 and substantially the same results as in Example 2 were obtained.

EXAMPLE 4

3 g of potassium chromate was used instead of 3 g of chromic anhydride in Example 2 and substantially the same results as in Example 2 were obtained.

EXAMPLE 5

When the baking was effected at 800° C for 5 minutes and the heat treatment at 800° C was omitted in Example 1, substantially the same properties as in Example 1 were obtained and the effect of the present invention was attained.

EXAMPLE 6

When the baking was effected at 800° C for 5 minutes and the heat treatment at 800° C was omitted in Example 2, substantially the same properties as in Example 2 were obtained and the effect of the present invention was attained.

What is claimed is:

1. A method for forming an insulating coating on an oriented steel sheet having a forsterite coating on its surface, said method comprising; applying a coating of an aqueous dispersion of 7–24% by weight of colloidal silica, 5–30% by weight of magnesium phosphate as monobasic magnesium phosphate, and 0.01–5% by weight of at least one member of the group consisting of chromic anhydride, chromate and bichromate, wherein the compounding ratio of magnesium phosphate to colloidal silica is 20/80–30/70%.

2. A method as claimed in claim 1, wherein said baking is effected under a neutral or weak oxidizing atmosphere.

3. A method as claimed in claim 1, wherein said baking is effected in two stages, the first stage being at a temperature of 350°–600° C and the second stage being at a temperature of 800°–900° C.

4. A coating aqueous dispersion for improving the compression stress property of the magnetostriction of an oriented silicon steel sheet consisting essentially of 7–24% by weight of colloidal silica and 5–30% by weight of magnesium phosphate as magnesium primary phosphate, the remainder being water.

* * * * *